(12) United States Patent
Scharnick

(10) Patent No.: US 8,643,225 B2
(45) Date of Patent: Feb. 4, 2014

(54) LOCK-OUT, TAG-OUT SYSTEM USING SAFETY NETWORK

(75) Inventor: Michael Scharnick, Brookfield, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 501 days.

(21) Appl. No.: 13/047,533

(22) Filed: Mar. 14, 2011

(65) Prior Publication Data

US 2012/0235515 A1 Sep. 20, 2012

(51) Int. Cl.
*H02H 11/00* (2006.01)

(52) U.S. Cl.
USPC .......................................... 307/326

(58) Field of Classification Search
USPC .......................................... 307/326
See application file for complete search history.

(56) References Cited

U.S. PATENT DOCUMENTS

| | | |
|---|---|---|
| 5,222,009 A | 6/1993 | Scharnick et al. |
| 5,510,951 A | 4/1996 | Briedis et al. |
| 6,130,488 A | 10/2000 | Hansen et al. |
| 6,631,476 B1 | 10/2003 | Vandesteeg et al. |
| 6,701,198 B1 | 3/2004 | Vandesteeg et al. |
| 6,721,900 B1 | 4/2004 | Lenner et al. |
| 6,891,850 B1 | 5/2005 | Vandesteeg et al. |
| 6,909,923 B2 | 6/2005 | Vasko et al. |
| 6,915,444 B2 | 7/2005 | Vasko et al. |
| 7,420,297 B2 | 9/2008 | Scharnick |
| 7,610,107 B2 | 10/2009 | Scharnick et al. |
| 7,675,200 B2 | 3/2010 | Scharnick |
| 7,868,487 B2 | 1/2011 | Scharnick et al. |
| 7,928,330 B2 | 4/2011 | Poyner et al. |
| 2004/0162635 A1 | 8/2004 | Murakami |
| 2008/0294273 A1 | 11/2008 | Scharnick |

OTHER PUBLICATIONS

ElectroGuard Safety Isolation System, Bulletin 2030, Bringing Safety Isolation Within Reach, pp. 1-8, admitted prior art, Rockwell Automation-Allen Bradley, Mayfield Heights, OH, USA.

*Primary Examiner* — Robert L. Deberadinis
(74) *Attorney, Agent, or Firm* — R. Scott Speroff; Boyle Fredrickson, S.C.; John M. Miller

(57) ABSTRACT

A remote lock-out, tag-out system for controlling multiple power control circuits in a motor control center employs a safety network providing serial communication between one or more remote lock-out, tag-out stations and individual power control circuits of the control center permitting remote disconnection of power without the need for protective gear.

19 Claims, 6 Drawing Sheets

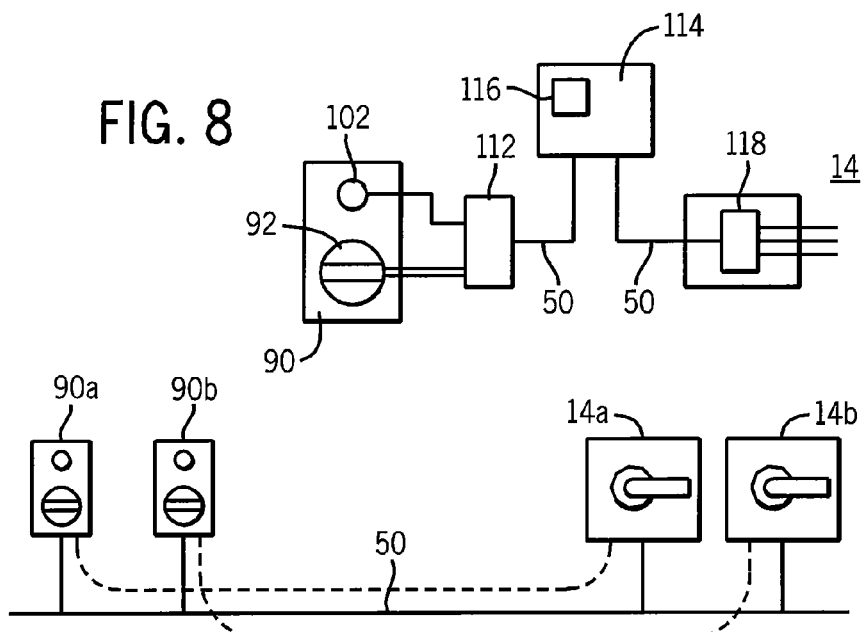
FIG. 8
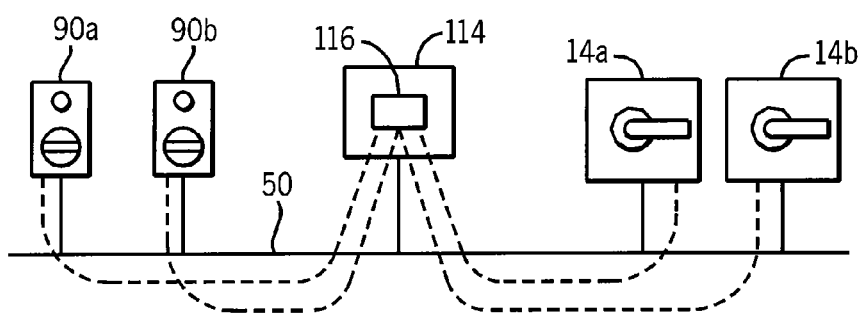
FIG. 9
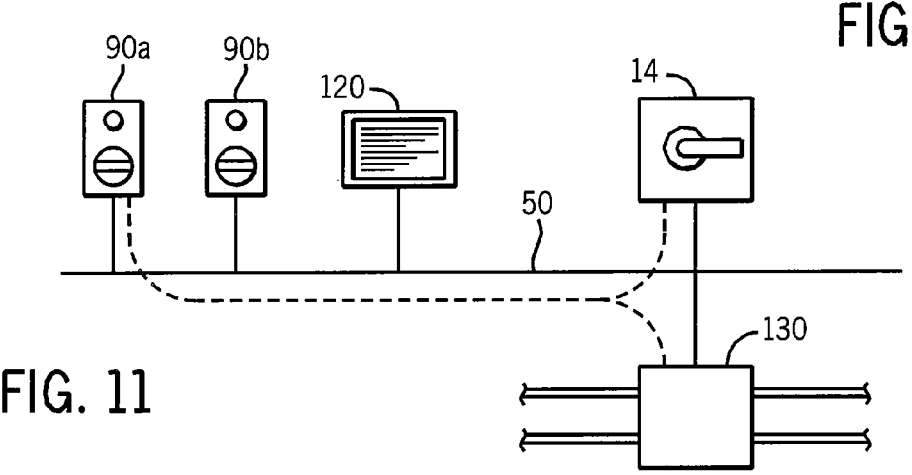
FIG. 10
FIG. 11

LOCK-OUT, TAG-OUT SYSTEM USING SAFETY NETWORK

CROSS-REFERENCE TO RELATED APPLICATIONS

FIELD OF THE INVENTION

The present invention relates to electrical control cabinets, for example, as used in a motor control center, and in particular to a method of remote lock-out, tag-out for such control cabinets.

BACKGROUND OF THE INVENTION

Industrial equipment in a factory or the like is normally controlled by a combination starter enclosed in a control cabinet. A combination starter is a single enclosure containing the motor starter, fuses or circuit breaker and a device for disconnecting power. Other devices associated with the control of the motor may also be included. The control cabinet provides a sturdy metal container holding circuitry to control and /or disconnect power to the equipment and to protect the equipment from excessive current in the event of equipment faults or variations of electrical power.

In many industrial applications, multiple electric motors are required and it is often desirable to control some or all of the motors from a central location. A "motor control center" is a physical grouping of the combination starters or control cabinets physically grouped into one assembly. A motor control center usually is a cabinet holding multiple independent drawers or "buckets". Each bucket may receive power from a common bus in the cabinet and provide individual disconnect and protection circuitry. By dividing the cabinet into buckets, each motor may have individualized control circuitry and may be separately connected and disconnected from power as may be desired. Typically each bucket has a disconnect operator on its front face that may be operated to disconnect power from the bucket and to provide a mechanical release of the bucket so that the bucket may be removed only when power is disconnected from the bucket.

While the structure of the motor control center provides for good protection against the risk of fire, electrocution and shock hazard, by isolating and disconnecting the buckets when they are extracted, there is recent concern for an additional hazard called arc flash. Arc flash is a result of the electrical arc that super heats the air around it, expanding and creating a pressure wave within an electrical enclosure. The massive heat and energy produced by an arc flash can inflict serious injury including burns from burning and vaporized material, damaged hearing from the sound wave, and impaired eyesight from the high intensity flash. For this reason, personnel working on motor control centers may be required to wear personal protective equipment (PPE) when in the vicinity of a motor control center.

During maintenance of industrial equipment, it is often necessary for maintenance personnel to work on machinery which could pose a hazard if not fully deactivated, or if accidentally reactivated, during maintenance. For this reason, it is known to use lock-out, tag-out (LOTO) procedures to ensure removal of power from such equipment for maintenance. Lock-out, tag-out devices provide a means that positively disconnect power to the associated equipment and which may be locked in the disconnect position with multiple padlocks, one padlock for each maintenance person in the vicinity of the machine. The padlocks provide a simple and reliable mechanism to ensure the machine is not activated accidentally or without the concurrence of all maintenance personnel working on the equipment.

While typically lock-out, tag-out devices are directly attached between the power and the associated machine, alternatively low voltage remote lock-out, tag-out switches have been developed, to be used in conjunction with Safety Isolation Equipment for example the ElectroGuard® safety isolation system commercially available from Rockwell Automation, the assignee of the present application. The system isolation equipment uses a redundantly monitored, remotely operated contactor-isolating system, packaged to provide the disconnection/isolation function. Remote lock-out, tag-out switches permit the operator with its padlocks to be located remote from the main power disconnecting means. This is possible through the use of redundant wiring, safety monitoring relays (having force-guided contacts and a coil structure requiring consistency into redundant inputs for operation) and redundant isolation contactors.

Remote lock-out, tag-out switches and system isolation equipment reduce the time required for maintenance personnel to walk from the machine being maintained to a typically a remote location where power may be disconnected.

SUMMARY OF THE INVENTION

The present inventor has recognized that a remote lock-out, tag-out switch is desirable for control cabinets such as motor control centers in order to permit the deactivation of motors without the need to don personal protective equipment. The invention provides individualized lock-out, tag-out multiple buckets without the burdensome redundant wiring between each remote lock-out, tag-out station and a corresponding bucket, by using safety network technology of the type developed for safety programmable logic controllers. By employing a safety network, multiple remote lock-out stations can serve multiple buckets with a single daisy chained network medium. Further, the mapping between the remote lock-out stations and the buckets may be flexibly changed without the need for rewiring.

Other features and advantages of the invention will become apparent to those skilled in the art upon review of the following detailed description, claims and drawings in which like numerals are used to designate like features.

BRIEF DESCRIPTION OF THE DRAWINGS

FIG. 8 is a figure similar to that of FIG. 6 showing a second embodiment employing an intervening safety programmable logic controller;

FIG. 9 is a block diagram showing communication between multiple remote lock-out stations and different buckets on a single network on a peer-to-peer basis;

FIG. 10 is a figure similar to that of FIG. 9 showing communication between multiple remote lock-out stations and different buckets with an intervening programmable logic controller;

FIG. 11 is a figure similar to that of FIGS. 9 and 10 showing expansion of the network to provide for display and other ancillary control;

DETAILED DESCRIPTION OF THE PREFERRED EMBODIMENT

Figure 1:
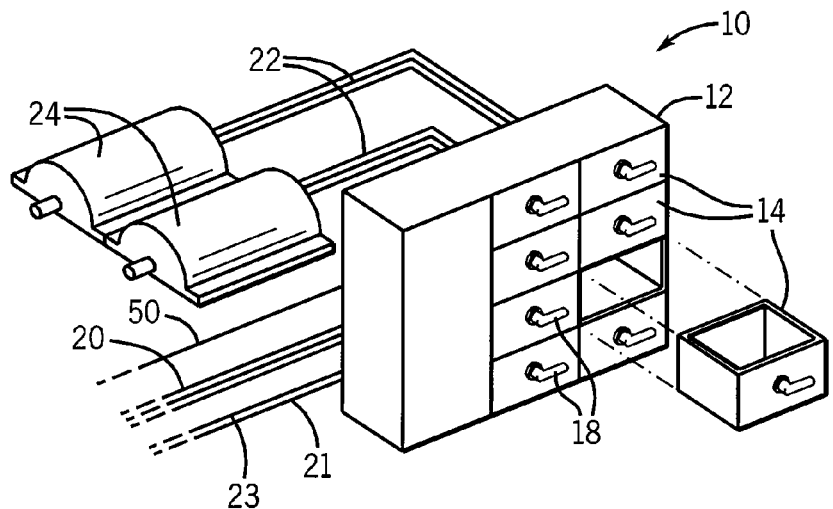
FIG. 1 is a simplified perspective view of a control center having multiple buckets employing the present invention.

Referring now to FIG. 1, a motor control center 10 may provide a cabinet 12, for example, of sheet steel holding one or more buckets 14 in the form of drawers that may be pulled out from the cabinet 12 for service. Typically each bucket 14 will have a disconnect 18 whose operator is accessible on its front surface. The disconnect 18, when rotated (or otherwise moved), will disconnect power inside the bucket and release a mechanical interlock or allow release of a mechanical interlock allowing the bucket to slide out of the cabinet 12 for service or the like. The operator of the disconnect 18 further provides a handle for that extraction. Generally, the buckets 14 each provide a sheet steel enclosure open at the top and meeting a standard for arc suppression such as IEEE 37.20.7-2007.

The cabinet 12 will provide for an internal power distribution bus (not shown in FIG. 1) distributing three-phase power 20, PE ground 23 and isolated ground 21 to the various buckets 14 and providing communication between individual buckets 14 and downstream conductors 22 connected to motors 24 or other loads used in a factory or industrial process.

Figure 2:
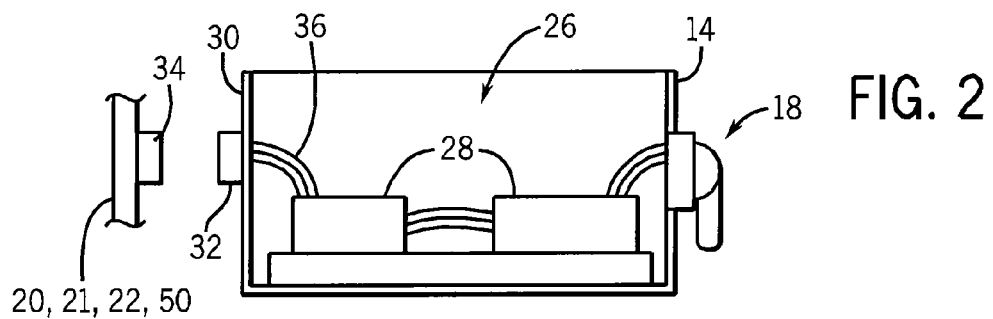
FIG. 2 is a cross-section of one bucket showing circuitry, rear facing connectors and the front facing disconnect operator.

Referring now to FIG. 2, each cabinet 12 provides an inner compartment 26 that may hold various circuit modules 28 providing disconnection, over-current protection, and monitoring as well as other functions as will be described. A rear wall 30 of the bucket 14, opposite the disconnect 18 and received inside the cabinet 12, may provide for one or more electrical connectors 32 releasably connecting with corresponding connectors 34 on a rear wall of the cabinet 12 and connected to the three-phase power 20, PE ground 23, isolated ground 21, and downstream conductors 22. Alternatively or in addition, some connectors other than three-phase power may be located inside the bucket 14 or the connectors may be eliminated in favor of hard wiring.

Figure 3:
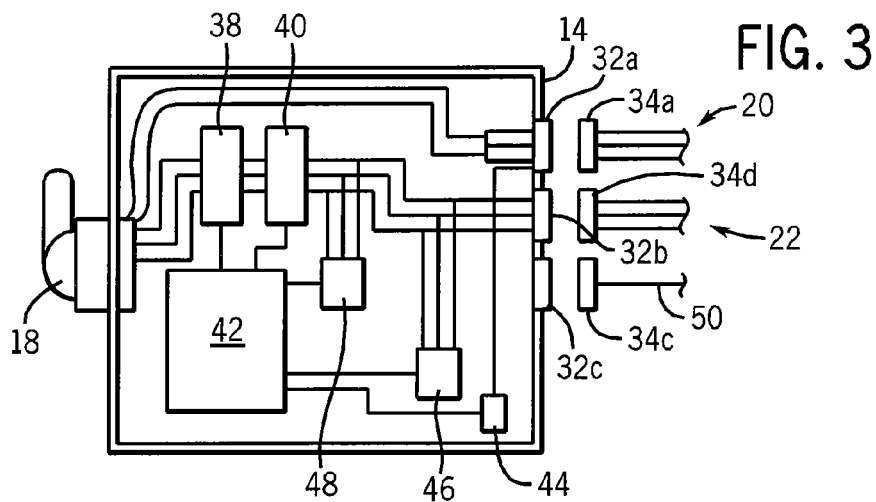
FIG. 3 is a block diagram of one example bucket of FIG. 2.

Referring now to FIG. 3, connector 32 on the bucket 14 may be attached to internal wiring 36 to connect with the circuit modules 28 and the disconnect 18. In one example bucket 14, per the present invention, three-phase power 20 may be introduced to the bucket via connector 32a and passed to disconnect 18 allowing the three-phase power 20 to be disconnected from the remaining circuit modules 28 when the bucket 14 is removed from the cabinet 12. From the disconnect 18, the three-phase power may pass through a primary contactor 38 having three contacts (one for each phase), each of the three contacts wired in series with corresponding contacts of a secondary contactor 40. Together the context of the primary contactor 38 and the secondary contactor 40 provide redundant disconnection of the remaining circuit modules 28.

Contactors 38 and 40 may be controlled by a safety network interface module 42, the latter communicating via connector 32c with a safety network 50 as will be described. An optional grounding contactor 46 may ground the output of contactor 40 (after contactor 40 is opened) to the isolated ground 21 providing additional assurance that no voltage is present on the load terminals of contactor 40. Contactor 40 could be connected to a circuit module 28 (a contactor, starter, solid-state starter or drive) and the power output then connected to connector 32b or directly to connector leading to the downstream conductors 22, to a motor 24, or other downstream equipment in the given or a different bucket 14.

The bucket 14 may also include a ground monitor 44 confirming the integrity of the isolated ground 21 connecting to the grounding electrode, a point where all the grounds of the power system may come together. Optionally, the output of the second contactor 40 may be monitored by an output voltage sensing circuit 48 verifying that contactors 38 and 40 are open by checking the voltage on the output of contactor 40. Outputs from the output voltage sensing circuit 48 and the ground monitor 44 are provided to the safety network interface module 42 which may communicate them over connector 32c to a safety network 50.

Safety network 50 is of a type that has been developed for communication of signals by a safety programmable logic controller used to implement safety systems, for example the implementation of a light curtain to protect operators from machines in hazardous operating states. Safety programmable logic controllers are suited for Safety Integrity Levels (SILs) of SIL 2 and 3 specified by organizations such as TUV from Germany, Factory Mutual (FM) from the United States, and Health and Safety Executive (HSE) from the United Kingdom. Safety PLCs differ from conventional PLCs in a number of ways including, typically, the use of redundant microprocessors, flash and randomly accessed memory that are compared to each other. The inputs and outputs of safety PLCs also include outputs for exercising the inputs to verify their functionality and inputs to verify redundant outputs.

Safety networks 50 are consistent with these standards and provide for serial communication similar to standard serial network protocols such as Ethernet or DeviceNet but add additional protocols, such as redundant packets that are compared at various points in the communication chain, sophisticated acknowledgment and confirmation messages, and additional error codes to ensure a reliability comparable to that obtained with redundant point-to-point wiring and safety relays. Example safety networks are taught by U.S. Pat. No. 6,915,444 Network independent safety protocol for industrial controller using data manipulation techniques; U.S. Pat. No. 6,909,923 Safety communication on a single backplane; U.S. Pat. No. 6,891,850 Network independent safety protocol for industrial controller; U.S. Pat. No. 6,721,900 Safety network for industrial controller having reduced bandwidth requirements; U.S. Pat. No. 6,701,198 Safety network for industrial controller allowing initialization on standard networks; U.S. Pat. No. 6,631,476 Safety network for industrial controller providing redundant connections on single media; all assigned to the same assignee as the present invention and hereby incorporated by reference.

A safety network 50 generally provides a probability of failure on demand of less than 0.001 and meets SIL-3 safety requirements. Safety networks 50 may therefore be readily distinguished from standard control networks which do not provide comparable assurances of safe operation. It should be noted that safe operation provided by safety systems such as safety network 50 may be distinguished from reliable operation in that safe operation ensures that any failure results in a safe state and not necessarily that failures are reduced to a certain level.

Figure 4:
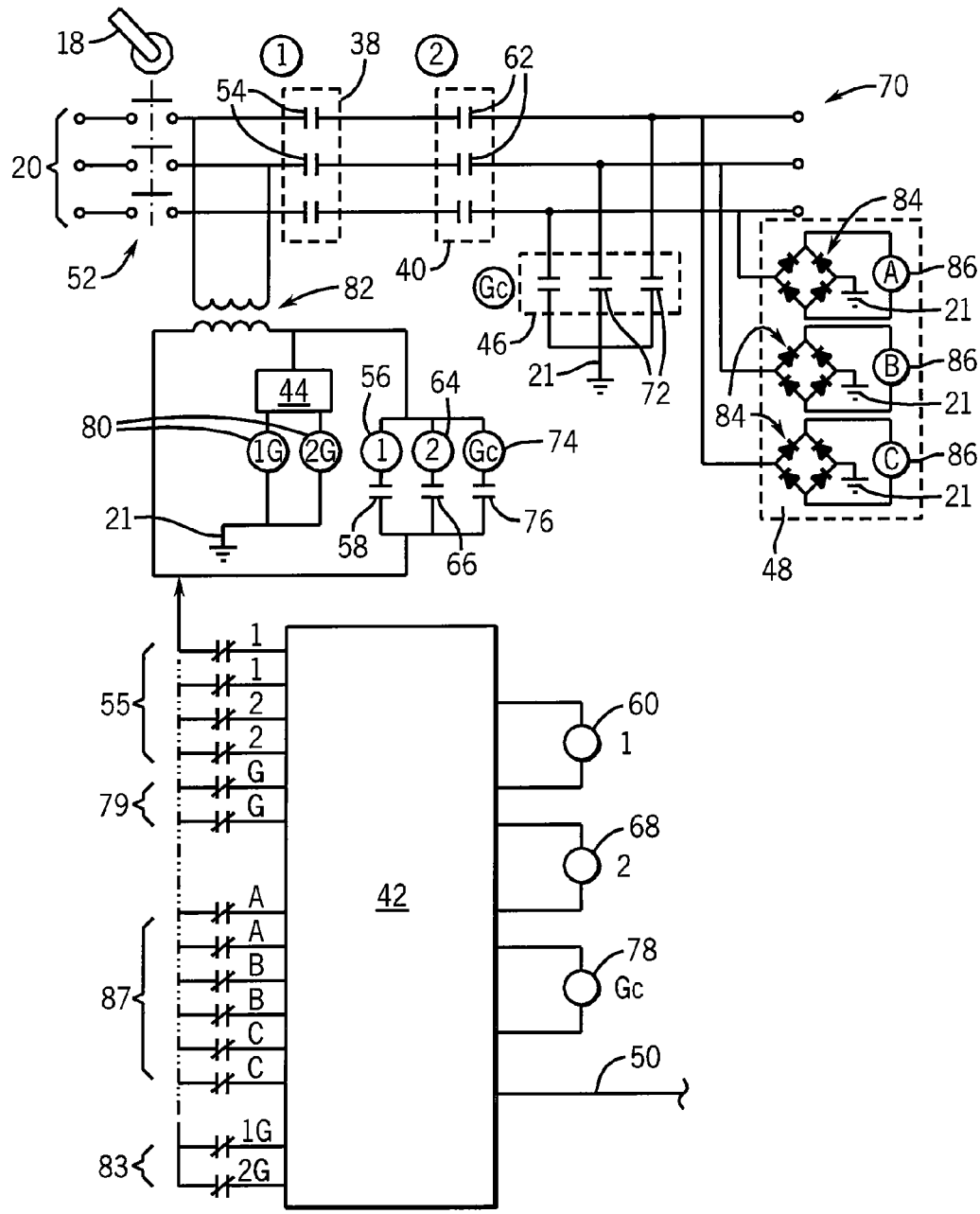
FIG. 4 is a schematic of the circuitry of the bucket of FIG. 3.

Referring now to FIG. 4, three-phase power 20 after passing through three contacts 52 of the disconnect 18 may be received by normally open contacts 54 (one for each phase) of the first contactor 38. These contacts 54 are controlled by a relay coil 56 wired in series with a control contact 58, the latter controlled by a relay coil 60 driven via the safety network interface module 42.

The output of each of the contacts 54 is wired in series with a corresponding contact 62 of the second contactor 40 controlled by relay coil 64 in series with contacts 66 driven by relay coil 68 the latter of which is controlled by an output of the safety network interface module 42.

Both contacts of contactors 38 and 40 need to be closed for power to be provided to terminal 70, in turn connected to connector 32a or other intervening circuit elements as will be discussed. When coils 60 and 68 are de-energized, the contacts of contactor 38 and 40 are open. Mirror contacts 55 for each of the contactors 38 and 40 are connected to the safety network interface module 42 to provide confirmation of the operation of these contactors 38 and 40 are open. As will be understood, NC mirror contacts are force guided contacts that must reflect mechanically the open state of contacts 54 or 62 respectively.

The normally open contacts 72 of grounding contactor 46 are connected to output of the contacts 62 (or terminal 70) to ground this output to the isolated ground 21 when closed. Generally, both the contactors 38 and 40 are electrically and mechanically interlocked with the grounding contactor 46 so that they both can't be on at the same time. These contacts 72 are driven by relay coil 74 in series with contact 76, the latter which may be controlled by a coil 78 driven by the safety network interface module 42. In this way, the safety network interface module 42 may ensure that those terminals 70 are grounded, for example, against the application of external power from an external fault. Mirror contacts 79 provide information to safety network interface module 42 of the operation of contacts 72 is not grounding the output 70.

Two ground sensing relay coils 80 are placed to be driven by the ground sensing circuit 44 connected between the output of transformer 82 and the relay coils 80. The ground sensing circuit 44 provides power to the relay coils 80 when the isolated ground 21 is detected assuring the presence of the isolated ground necessary to provide for the grounding for contactor 46. These ground sensing relay coils 80 operate contacts 83 connected to the safety network interface module 42 to provide confirmation of the presence of the isolated ground.

In one configuration, the output voltage sensing circuit 48 provides three full wave rectifiers 84 each having an input connected to a different phase of power at output terminal 70 and whose outputs drive different sensing relay coils 86, one for each phase, to confirm that the three-phases at the output of contacts 62 are below a specified voltage level. These relay coils 86 drive normally open and normally closed contacts 87 redundantly to provide information to the safety network interface module 42.

Safety network interface module 42 may provide internal logic to confirm proper shutdown of power at terminals 70 by opening contacts 54 and 62, then closing contacts 72, then confirming operation of contacts 54, 62 and 72 and the presence of the isolated ground connection and the absence of power through relay coils 86 before sending a confirmation message back to a remote lock-out station over safety network 50, as will now be described.

Figure 5:
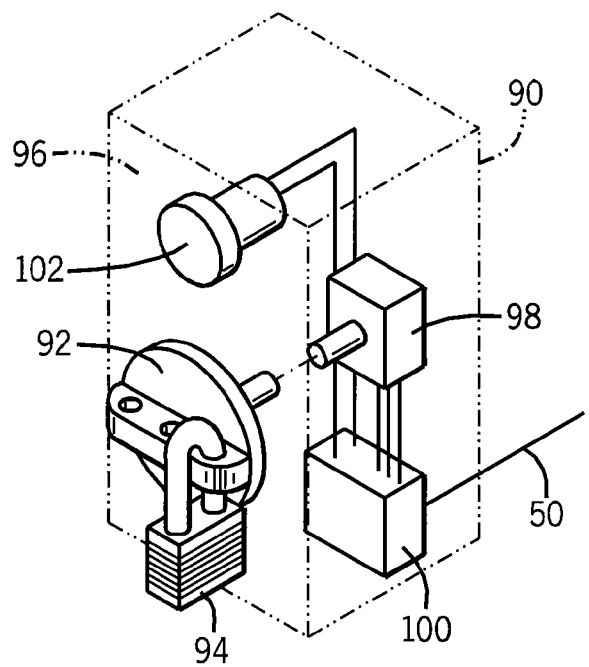
FIG. 5 is a phantom perspective view of a remote lock-out station for communicating with the buckets of FIG. 4.

Referring now to FIGS. 5, the safety network 50 from the safety network interface module 42 may communicate with a remote lock-out station 90 which may be operated to disconnect or lock-out one or more buckets 14 by providing signals over safety network 50 to the appropriate safety network interface modules 42 to initiate the disconnect sequence described above. These signals are initiated by rotation of a lock-out operator 92 exposed at a front of a cabinet of the remote lock-out station 90. The lock-out operator 92 has provision for the addition of padlocks 94 that can mechanically lock the rotational position of the operator 92 into the deactivation position (initiating the lock-out sequence described above) requiring those padlocks 94 to be removed before rotation of the operator 92 into an activation position, where the above described lock-out sequence is reversed so that downstream equipment may have power. Multiple padlocks 94 may be received by the operator 92 which may operate only when every padlock 94 is removed.

The operator 92 has a shaft passing into a housing 96 of the remote lock-out station 90 to a switch block 98 providing for redundant contacts communicating with a safety network interface module 100 operating similarly to safety network interface module 42 to communicate over the safety network 50 to transmit and receive signals. Safety network interface module 100 also communicates with indicator light 102 providing a signal indicating that the machine has been correctly disconnected based on signals received from the safety network interface module 42.

In one embodiment, the RLS 90 may connect to a local isolated source of electrical power (not shown) or from the system isolation equipment to provide power to the safety network interface module 100 and indicator light 102. This approach eliminates the need for passing power conductors between possibly safe and unsafe zones (for example in the case of zones having an explosion risk). Alternatively, the present invention contemplates that in some embodiments the power needed by the RLS 90 may be provided over the medium of the safety network 50.

Figure 7:
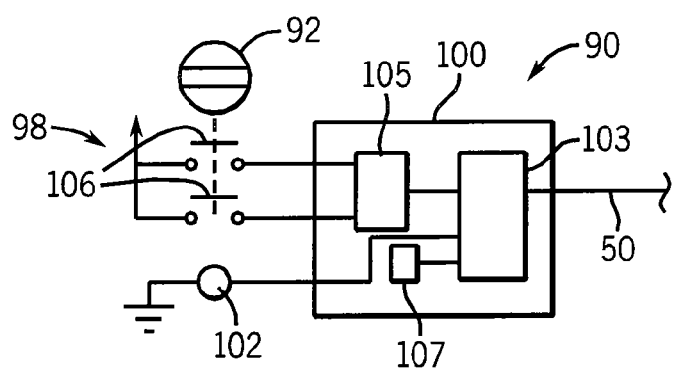
FIG. 7 is a block diagram of circuitry of the remote lock-out station for use with a peer-to-peer connection.

Referring now to FIGS. 4, 5 and 7, with the RLS 90 of FIG. 5 turned to the ON position, the switch contacts 106 of switch block 98 are closed. Interface module 100 reads the state of the contacts 106 and communicates the closed state of the contacts over the safety network 50.

Network interface module 42 then receives the command to turn ON power to the load via terminals 70. In response, the interface module 42 de-energizes interposing relay coil 78 (GC) which opens contacts 76 and de-energizes GC relay coil 74 so that the contacts 72 open.

Network interface module 42 then reads the status of the mirror contacts 79 of the GC relay, indicating the power contacts 72 are open. If both contacts 79 are closed, the network interface module 42 energizes interposing relays coils 60 and 68 (1 and 2) closing contacts 58 and 66. The relay coils 56 and 64 of contactors 38 and 40 items are then energized closing the contacts 54 and 62.

Once voltage is present at output terminals 70, the output voltage monitoring circuit 48 senses voltage is being supplied to the connected load by means of the output voltage monitoring circuit 48. The output voltage monitoring circuit 48 depicted is one of many possible configuration for determining voltage is present. The phase to neutral voltages are rectified by diode bridges 84 and the rectified voltage energizes coils 86 (A, B and C). The normally open contacts 87 of relays A, B and C items then close. The network interface module 42 reads the closed status of normally open contacts 87 indicating voltage is being supplied to the output terminals 70.

With the RLS 90 of FIG. 5 turned to the OFF position where it may be locked with padlocks 94, the switch contacts of 98 are open. As before, the interface module 100 reads the state of the contacts 106 and communicates the open state of the contacts 106 (if one contact or both are open) over the safety network 50.

Network interface module 42 then receives the command to turn OFF power to the load 70. Interface module de-energizes interposing relay coils 60 and 68 (relays 1 and 2) which opens contacts 58 and 66 and de-energizes relay coils 56 and 64 of contactors 1 and 2 to open the contacts 54 and 62 of contactors 38 and 40 open.

Network interface module 42 then reads the status of the normally closed mirror contacts 55 of contactors 38 and 40, indicating the power contacts 54 and 62 are open. Once voltage is no longer present at output 70, the output voltage monitoring circuit 48 senses voltage is below a specified level. The normally closed contacts 87 of coils 86 then close.

The network interface module 42 then reads the closed status of the normally closed contacts 87 indicating voltage is below a specified level at output terminals 70. The network interface module 42 then energizes relay 78 which closes contacts 76 and energizes contactor coil 74. Contacts 72 of contactor 46 close connecting the output terminal 70 to isolated ground 21. Only after the voltage monitoring circuit 48 sensed the three phase power at terminal 70 is below a specified level and the optional grounding contactor 46 is energized, the network interface module 42 sends the system isolated signal over the safety network 50 to the RLS 90.

In the RLS 90, the interface module 100 receives the system isolated signal over the safety network 50. The system isolated light 102 is illuminated to indicate the system has isolated and is safe.

Figure 6:
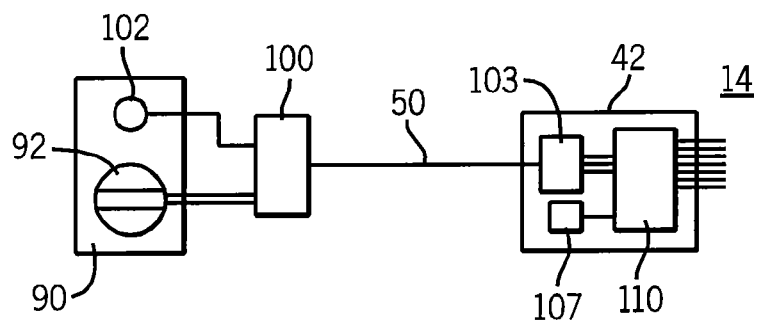
FIG. 6 is a block diagram of a first embodiment of the invention providing peer to peer connection.

Referring now to FIG. 6, in an embodiment, the remote lock-out station 90 may operate in a peer-to-peer fashion with safety network interface module 42 in buckets 14 communicating directly with the remote lock-out station 90. As indicated in FIG. 7, in this case safety network interface module 100 has an internal logic engine 105 that receives the redundant signals from contacts 106 of the switch block 98 to evaluate their consistency so that, for example, when either or both of the switch contacts 106 are open, a signal is sent over the safety network 50 to deactivate the machine, and where both switch contacts 106 must be closed before the machine may be reactivated. The internal logic engine 105 may also detect inconsistency in the contacts 106 to indicate an error condition.

The internal logic engine 105 communicates with a network protocol circuit 103 which may also communicate with a switch bank 107 allowing entry of an address of the safety network interface module 42 in the bucket 14 with which the remote lock-out station 90 is to be associated for communication. Likewise, and referring again to FIG. 6, the safety network interface module 42 has a network protocol circuit 103 communicating with switch bank 107 to indicate the address of the safety network interface module 100 with which it communicates. The safety network interface module 42 may also have internal logic engine 110 implement the shutdown procedures described above and reconcile inconsistent contact states and flag possible errors.

Referring now to FIG. 8, in an alternative embodiment, the remote lock-out station 90 may communicate with safety I/O module 112 of a standard safety PLC 114, for example, a GuardLogic® PLC manufactured by Rockwell Automation of Milwaukee, Wis.

In this case, the safety I/O module 112 and the safety PLC 114 serve as the safety network interface module 100, with the safety I/O module 112 receiving the signals from contacts 106 as digital inputs and providing a digital output to control the indicator light 102 in the manner of network protocol circuit 103. Signals from the safety I/O module 112 are communicated on the safety bus of the safety PLC 114, the former acting as a safety network 50. The necessary logic implemented by logic engine 105 may then be implemented by a stored program 116 within the safety PLC.

The program 116 may then identify a corresponding safety I/O module 118 in a bucket 14. The safety I/O module 118 may provide the functions of the network protocol circuit 103 of the safety network interface module 42 and the program 116 may provide the functions of the logic engine 110.

In this case, switch banks 107 are not required but each safety I/O module 112 and 118 may have a unique serial number and the connection of the units may be handled by a mapping table forming part of the program 116 establishing a correspondence between remote lock-out stations 90 and buckets 14.

It will be understood that the safety PLC 114 through program 116 may in addition to controlling the application of power in the buckets 14 may operate and supervise other equipment such as light curtains, protective gates and the like and that other safety signals may be communicated over safety network 50 for added efficiency.

Referring now to FIG. 9, the present invention allows a single safety network 50 to communicate among multiple remote lock-out stations 90a and 90b (only two shown for clarity) and multiple buckets 14a and 14b providing separate control of each. The independent communication between remote lock-out stations 90 and buckets 14 is enforced by addresses of the packets on the safety network 50 and not by dedicated wiring. Thus, for example, a remote lock-out station 90a may be programmed to communicate solely with bucket 14a and remote lock-out station 90b may be programmed to communicate solely with bucket 14b despite the shared media of safety network 50. It will also be understood that a single remote lock-out station 90a may control multiple buckets 14a and 14b as desired.

Referring now to FIG. 10 when implemented with a safety PLC 114, each of the remote lock-out stations 90a and 90b may communicate with the safety PLC which may perform the mapping to communicate with the particular buckets 14a and 14b.

Referring now to FIG. 11, it will be appreciated that the adoption of the safety network for communication between remote lock-out stations 90 and buckets 14 may permit the addition of other network devices such as the human machine interface (HMI) 120 on the network to provide information about the status of machines or the like. In addition the signals from any given remote lock-out station 90 may communicate not only with a bucket holding electrical control circuits but with other energy controlling elements such as, for example, a pneumatic valve or hydraulic valve system 130 used to remove hydraulic or pneumatic power from the machine together with, or instead of, electrical power. It will be appreciated from this and the following description, that these other energy controlling elements may be incorporated into any of the embodiments described herein or used in lieu of the electrical control elements.

Figure 12:
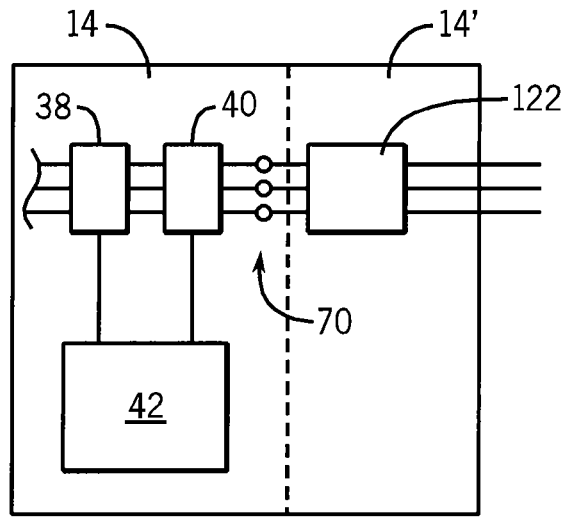
FIG. 12 is a simplified diagram showing additional power control as may be implemented by the bucket.

Referring now to FIG. 12, it will be appreciated that a variety of different types of electrical control modules may be placed in each bucket, and, for example, the contactors 38 and 40 may lead not directly to a external devices but to other intermediate devices 122 such as a starter, overload relay, motor drive, circuit breaker, resistive load, transformer or other device where power may need to be disconnected, or the like contained in the same bucket 14 or in an adjacent bucket 14.

Figure 13:
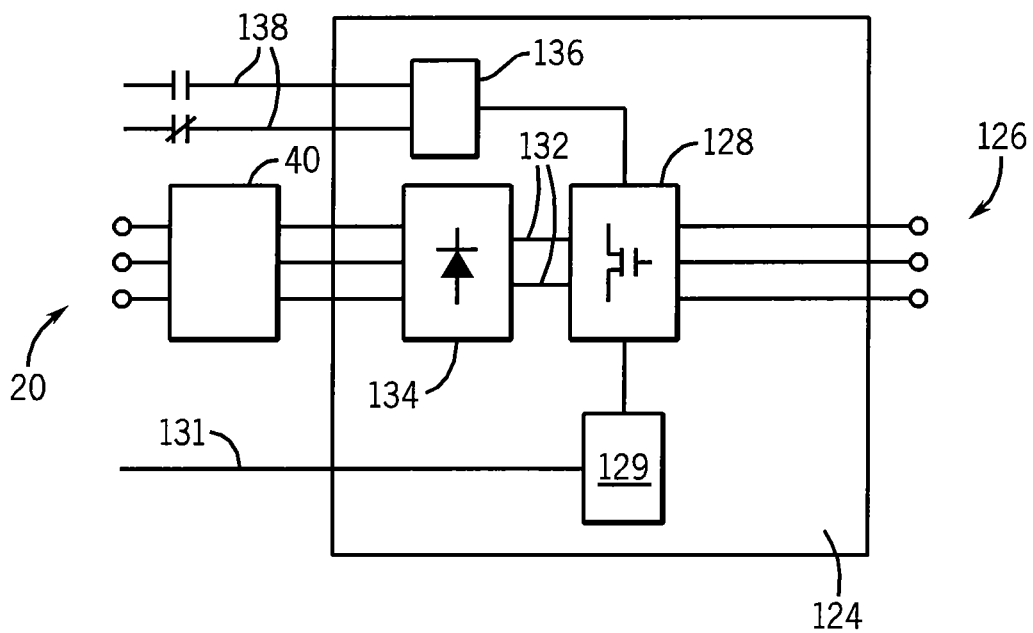
FIG. 13 is a simplified block diagram of the safe-off drive as may be controlled by the system of the present invention.

Referring now to FIG. 13, it is contemplated that the present invention may work with a safe-off motor drive 124 of the type providing synthesized voltage waveforms at terminals 126 for sophisticated control of motor start up, stopping and operation. The synthesized waveforms at terminals 126 are produced by solid-state drives 128 sequenced by a control circuit 129 receiving command signals 131, for example, from a standard programmable logic controller (not shown). The solid-state drive 128 receives DC power on a DC bus 132 from a rectifier system 134 receiving three-phase power, for example, from terminal 70 after contactor 40 (shown in FIG. 4). Contactor 38 may be eliminated in this situation in favor of redundant signals 138 from the safety network interface module 42 controlling a safety relay 136 or directly via a network interface module 42. The safety relay 136 disconnects drive or gate voltage from the solid-state drive 128 providing a separate path of the activation of the safe-off motor drive 124.

Figure 14:
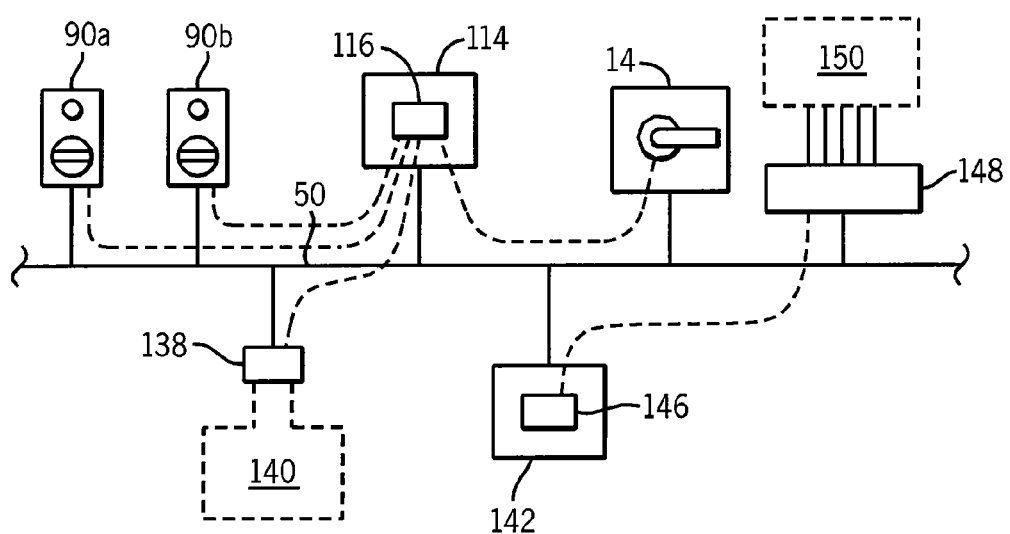
FIG. 14 is a figure similar to that of FIG. 10 showing sharing of the network between a safety PLC and a standard PLC.

Referring now to FIG. 14, the safety PLC 114, as noted above, may also operate and supervise other safety equipment 140 such as light curtains, protective gates and the like through one or more safety I/O modules 142 allowing coordination of the operation of this safety equipment 140 with the application of power to other equipment through the buckets 14. The same safety network 50 may, in one embodiment, also accommodate standard industrial control signals from a standard programmable logic controller 142 executing a control program 146, for example, communicating signals to and receiving signals from standard I/O modules 148 connected to the industrial equipment 150 to control routine operation of industrial equipment 150. To the extent that the network 50 may communicate safety signals over a network through the addition of safety protocols providing for redundancy and error detection, the same network 50 may be used for standard industrial control without the safety protocols. Problems of conflict in network demand may be accommodated by the safety protocol detecting failure of timely communication of safety signals to revert to a safe state.

As depicted, two RLS's 90*a* and 90*b* may both communicate on the safety network 50 to control one bucket 14*a*. In such cases, the safety PLC 114 could controls the displays of the RLS's 90*a* and 90*b* or the RLS's 90*a* and 90*b* could also control the display so that the light 102 (shown in FIG. 5) on the RLS 90*a* or 90*b* indicates the deactivation of the bucket 14*a* only on the specific RLS 90*a* or 90*b* which is actually locked and tagged out. In this way, individuals are not led to rely upon an indication by a light on any RLS 90 which is not actually locked. An HMI may provide an overview of the activated RLS's 90 for troubleshooting purposes. When the RLS's 90*a* and 90*b* are operated peer-to-peer, for example, as discussed with respect to FIG. 9, similar logic may be implemented by circuitry of either the RLS 90 or the buckets 14 as may be appropriate.

Alternatively, a single RLS 90*a* may control multiple buckets (for example as possible with the architecture depicted in FIG. 10). In this case, the light 102 (shown in FIG. 5) on the RLS 90*a* indicates a deactivation only when both buckets 14*a* and 14*b* are deactivated. In this way, individuals are not led to rely upon an indication by a light on RLS 90*a* when both buckets 14*a* and 14*b* are not deactivated. Again, this logic may be implemented either by an intervening safety PLC 114 or by circuitry of either the RLS 90 or the buckets 14 as may be appropriate in a peer-to-peer case.

Certain terminology is used herein for purposes of reference only, and thus is not intended to be limiting. For example, terms such as "upper", "lower", "above", and "below" refer to directions in the drawings to which reference is made. Terms such as "left", "right", "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

Various features of the invention are set forth in the following claims. It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

What is claimed is:

1. A lock-out, tag-out system for a power control cabinet, the lock-out, tag-out system comprising:
   (1) at least one lock-out, tag-out station providing:
      (a) at least two contacts having a shared operator for receiving a padlock when the operator is in a deactivation position, the padlock blocking actuation of the operator,
      (b) a display indicating deactivation of at least one associated motor circuit; and
      (c) a first safety network interface element connected to the contacts and the display to transmit a contact state and receive a display state using redundant data on a serial network configured to provide SIL-3 reliable communication;
   (2) power control circuit positionable in the power control cabinet, the power control circuit providing:
      (a) a first and second contactor each providing coil switching independent contacts, the contacts of the first contactor in series with the contacts of the second contactor to communicate, when closed, electrical power between a power source and the motor circuitry;
      (b) a voltage sensor detecting voltage at a connection between the motor circuitry and the first and second contactor to detect removal of power from the motor circuitry;

(c) a second safety network interface element communicating on the serial network to receive the contact state to control the coils of the first and second contactors and transmit display state derived from the voltage sensor detecting removal of power from the motor circuitry;

wherein the first and second safety network interface communicate peer-to-peer without an intervening safety controller.

2. The lock-out, tag-out system of claim 1 wherein the power control circuit further includes a third contactor having a coil, the contacts of the third contactor connecting between isolated ground and the connection between the motor circuitry and the first and second contactor, wherein the second safety network interface element receives the contact state to control the coil of the third contactor to ground the motor circuitry when contacts of the first and second contactor are open.

3. The lock-out, tag-out system of claim 1 wherein the serial network together with the first and second safety network interface elements provides a probability of failure on demand of 0.001-0.0001.

4. The lock-out, tag-out system of claim 1 wherein the first safety network interface element transmits a contact state causing an opening of the contacts of the first and second contractor when one or both of the two contacts of the operator are open.

5. The lock-out, tag-out system of claim 1 wherein the power control circuit meets IEEE C 37.20.7-2007 standards for arc suppression.

6. The lock-out, tag-out system of claim 1 wherein the power control circuit further includes a device selected from the group consisting of: a contactor, a motor starter, a solid-state starter and a motor drive between the second contacts and the motor circuitry.

7. The lock-out, tag-out system of claim 1 wherein the first and second contactors each provide mirror contacts communicating with the second safety network interface and wherein a transmission of the display state is determined at least in part by the state of the mirror contacts.

8. The lock-out, tag-out system of claim 1 further including multiple lock-out, tag-out stations with multiple corresponding first safety network interface elements communicating with the second safety network interface elements to control the coils of the first and second contactors and transmit display state derived from the voltage sensor detecting removal of power from the motor circuitry from multiple remote locations;

wherein the display associated with each lock-out, tag-out station only indicates the deactivation for individual lock-out, tag-out stations whose operators are in the deactivation position.

9. The lock-out, tag-out system of claim 1 further including multiple power control circuits wherein the lock-out, tag-out station and its first safety network interface element communicates with multiple second safety network interface elements of the power control circuits to control the coils of first and second contactors and transmit the display state derived from the voltage sensor detecting removal of power from the motor circuitry from multiple remote locations associated with the multiple power control circuits;

wherein the display indicates deactivation only when removal of power has occurred at all of the multiple remote locations associated with the multiple power control circuits.

10. The lock-out, tag-out system of claim 1 further including a second device associated with an industrial process and communicating with the serial network to receive and transmit data on the serial network for communication with the industrial process.

11. The lock-out, tag-out system of claim 1 further including at least one of a pneumatic valve or hydraulic valve system used to remove hydraulic and pneumatic power from a machine and including a third safety network interface element communicating on the serial network to receive the contact state to control the at least one of the pneumatic valve and hydraulic valve system and transmit display state derived from the pressure sensor detecting removal of pneumatic or hydraulic energy from the at least one of the pneumatic valve and hydraulic valve system.

12. A power control circuit for a power control cabinet comprising an arc-flash resistant housing and holding:

a first and second contactor each providing a coil switching independent contacts, the contacts of the first contactor in series with contacts of the second contactor, each series-connected contact receiving at a first terminal electrical power from the second releasable electrical connector from a power source and providing switched power from a second terminal to the second releasable electrical connector for operation of a motor;

a voltage sensor detecting voltage at the second terminal;

a safety network interface element providing control signals to the coils of the first and second contactors and communicating with the voltage sensor to receive input signals from the voltage sensor, the safety network interface element providing redundant communication on a serial network with remote lock-out switches to provide an SIL-3 reliable communication to receive data of the control signals and to transmit data of the input signals on the serial network wherein the safety network interface element and the remote lock-out, switches communicate peer-to-peer without an intervening safety controller.

13. The lock-out, tag-out system of claim 12 wherein the power control circuit further includes a third contactor having a coil and communicating between the contacts of the third contactor connecting between isolated ground and the connection between the motor circuitry and the first and second contactor, wherein the second safety interface element receives the contact state to control the coil of the third contactor to ground the motor circuitry when contacts of the first and second contactor are open.

14. The lock-out, tag-out system of claim 12 wherein the power control circuit further includes at least one of a device selected from the group consisting of: a contactor, a motor starter, a solid-state starter and a motor drive between the second contacts and the motor circuitry.

15. A lock-out, tag-out station comprising:

(a) contacts having a shared operator, the operator adapted to receive a padlock when the operator is in a deactivation position, the padlock blocking actuation of the operator, (b) a display indicating deactivation of at least one associated motor circuit; and (c) a first safety network interface element connected to the contacts and the display to transmit a contact state and receive a display state using redundant data on a serial network configured to provide SIL-3 reliable communication to system isolation equipment on a peer-to-peer basis with a second safety network interface element without an intervening programmable logic controller.

16. The lock-out, tag-out station of claim 15 wherein the safety network interface transmits a first contact state when at least one of the contacts are open and a second contact state when all contacts are closed.

17. A lock-out, tag-out system for a motor control center of the type providing for multiple bucket-receiving openings and holding conductors for communicating with motor circuitry, the lock-out, tag-out system providing a bucket comprising
- an arc-flash resistant housing fitting within the motor control center and holding:
- a first contactor providing a coil switching contacts receiving at first terminals electrical power from a power source and providing switched power at second terminals;
- a voltage sensor detecting voltage at the second terminals;
- a safe-off motor drive having power terminals connected to the second terminals, the power terminals providing internal power for the safe-off motor drive, the safe-off motor drive further including a switch element disconnecting internal power from power semiconductors used to synthesize motor drive voltages;
- a safety network interface element:
  - (a) providing a control signal to the coil of the first contactor;
  - (b) communicating with the voltage sensor to receive input signals from the voltage sensor;
  - (c) providing a control signal to the switch element;
- the safety network interface element providing redundant communication on a serial network with remote lock-out switches to provide an SIL-3 reliable communication to receive data of the control signals and to transmit data of the input signals on the serial network
- wherein the safety network interface element and the remote lock-out, switches communicate peer-to-peer without an intervening safety controller.

18. The lock-out, tag-out system of claim 17 further including a lock-out, tag-out station comprising:
- (a) contacts having a shared operator, the operator adapted to receive a padlock when the operator is in a deactivation position, the padlock blocking actuation of the operator,
- (b) a display indicating deactivation of at least one associated motor circuit; and
- (c) a second safety network interface element connected to the contacts and the display to transmit a contact state and receive a display state using redundant data on the serial network configured to provide SIL-3 reliable communication to at least one bucket of a motor control center.

19. A lock-out, tag-out system for a power control cabinet, the lock-out, tag-out system comprising:
- (1) at least one lock-out, tag-out station providing:
  - (a) at least two contacts having a shared operator for receiving a padlock when the operator is in a deactivation position, the padlock blocking actuation of the operator,
  - (b) a display indicating deactivation of at least one associated motor circuit; and
  - (c) a first safety network interface element connected to the contacts and the display to transmit a contact state and receive a display state using redundant data on a serial network configured to provide SIL-3 reliable communication;
- (2) power control circuit positionable in the power control cabinet, the power control circuit providing:
  - (a) at least one of a pneumatic valve or hydraulic valve system used to remove hydraulic and pneumatic power from a machine;
  - (b) a second safety network interface element communicating on the serial network to receive the contact state to control the at least one of a pneumatic valve or hydraulic valve system and transmit display state derived from the pressure sensor detecting removal of pneumatic or hydraulic energy from the at least one of a pneumatic valve or hydraulic valve system;
- wherein the first and second safety network interface communicate peer-to-peer without an intervening safety controller.

\* \* \* \* \*